P. J. McCABE.
INCUBATOR.
APPLICATION FILED JULY 3, 1908.

926,434.

Patented June 29, 1909.
3 SHEETS—SHEET 1.

Witnesses
Geo. H. Byrne.
H. H. Byrne.

Inventor
Patrick J. McCabe
By C. D. Geddes
Attorney

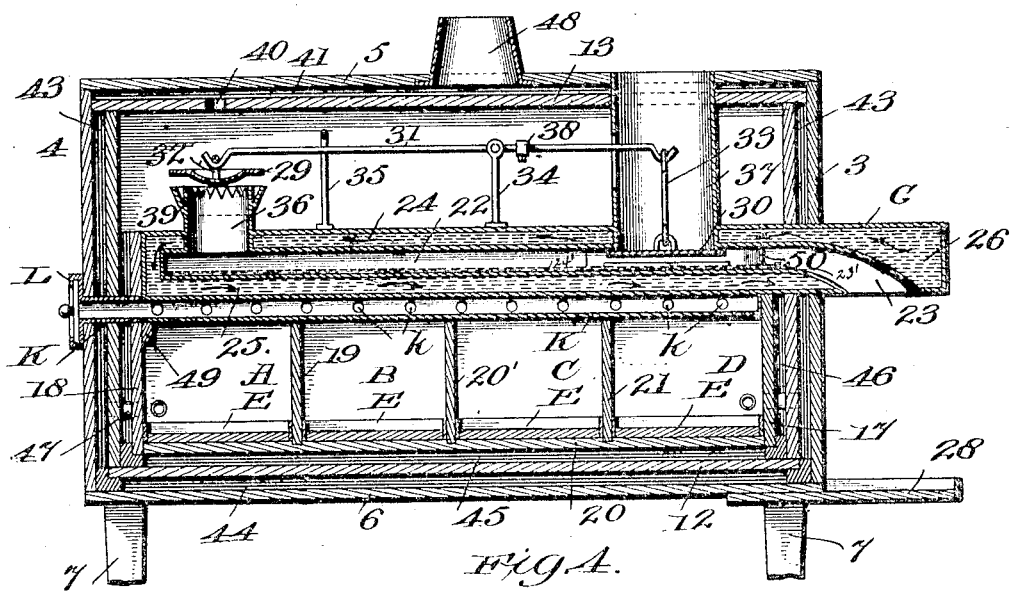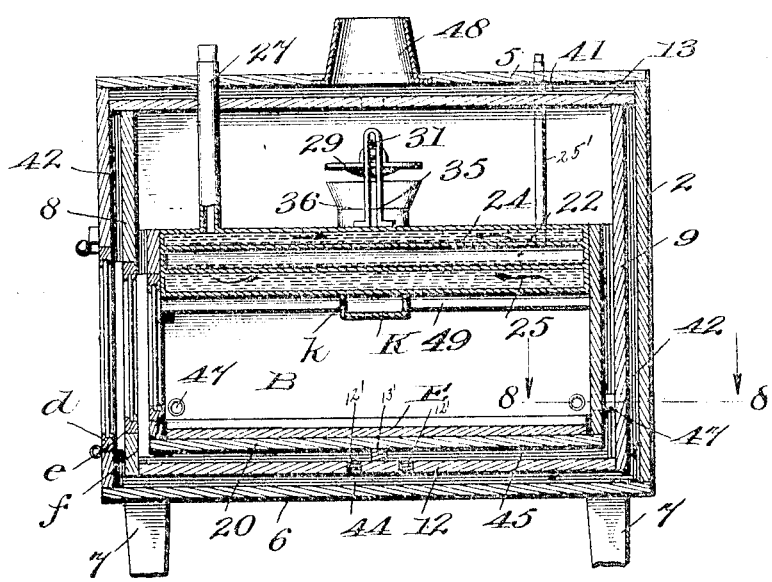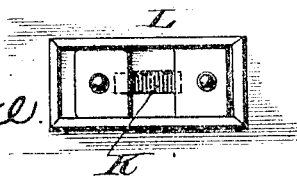

P. J. McCABE.
INCUBATOR.
APPLICATION FILED JULY 3, 1908.
926,434.
Patented June 29, 1909.
3 SHEETS—SHEET 3.
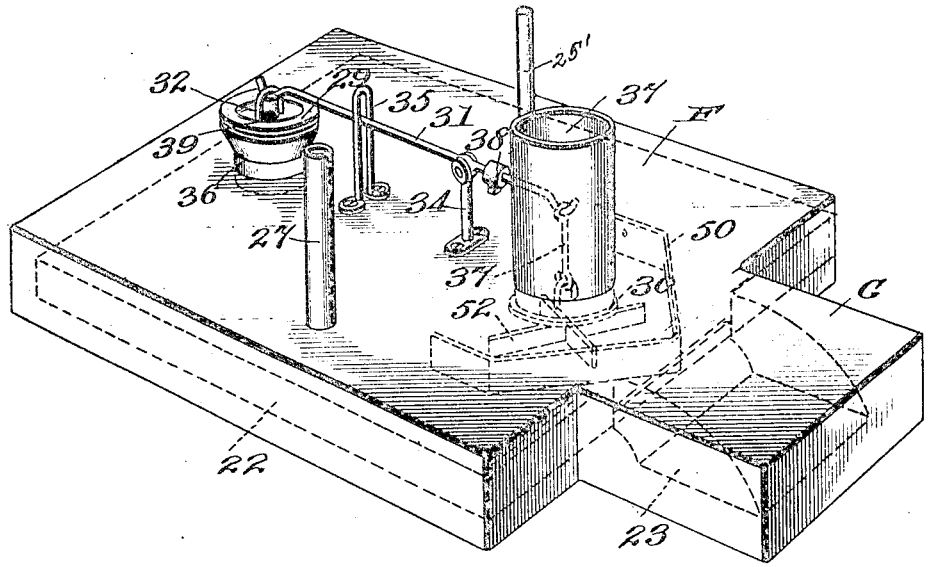
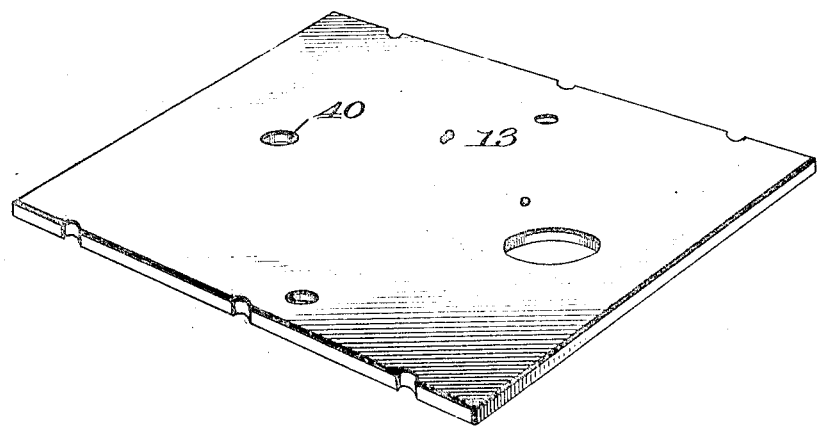
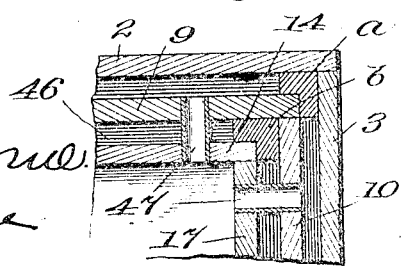
Witnesses
Geo. A. Byrne
H. H. Byrne
Inventor
Patrick J. McCabe
By C. D. Gedder
Attorney

UNITED STATES PATENT OFFICE.

PATRICK J. McCABE, OF WASHINGTON, MINNESOTA.

INCUBATOR.

No. 926,434.  Specification of Letters Patent.  Patented June 29, 1909.

Application filed July 3, 1908. Serial No. 441,817.

*To all whom it may concern:*

Be it known that I, PATRICK J. MCCABE, a citizen of the United States, residing at Washington, in the county of Lesueur and State of Minnesota, have invented new and useful Improvements in Incubators, of which the following is a specification.

This invention pertains to incubators and has for its purpose to provide a device of that character wherein the temperature may be automatically regulated so as to be non-variable; and one wherein substantially all the working parts are contained within the incubator.

It further provides an incubator of such structural arrangement that the hatching chambers or egg sections are removed and separated from the temperature chamber whereby the temperature of the hatching chambers may be controlled without molestation.

The incubator comprises three separate sections or receptacles of different dimensions contained or nested one within the other, and providing between them a plurality of air spaces which serve to maintain an even temperature within the incubator irrespective of the outside temperature.

Figure 1:
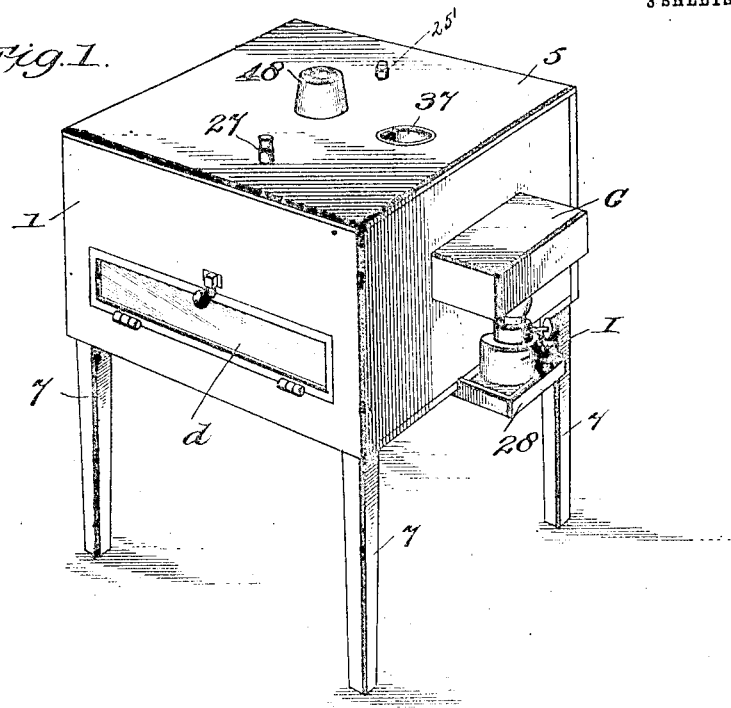
Figure 2:
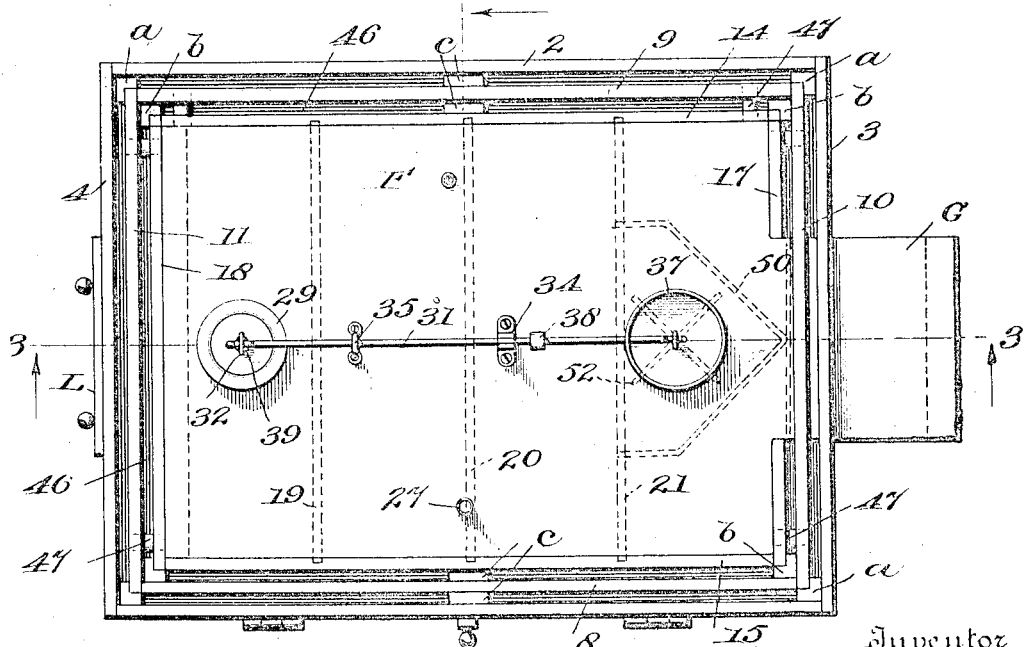

With these and subordinate objects in view, which shall be pointed out in the following specification, and set forth in the claims, the preferred embodiment of my invention is illustrated in the accompanying drawings, wherein:

Figure 1 is a perspective view of the incubator. Fig. 2 is a top plan view of the same with the cover removed. Fig. 3 is a horizontal view in section taken on the line 3—3 of Fig. 2. Fig. 4 is a transverse section taken on the line 4—4 of Fig. 2. Fig. 5 is a detail view of the vent regulator for the hatching chambers. Fig. 6 is a perspective view of the heating tank and regulator therefor. Fig. 7 is a perspective view of the inner top wall, and Fig. 8 is a detail sectional view of one of the corners of the frame structure taken on the line 8—8 of Fig. 4.

Referring more in detail to the drawings wherein like numerals and letters of reference designate corresponding parts in the different figures shown, the incubator comprises an outer casing having front and back walls 1 and 2 respectively, sides 3 and 4, top 5, and base, or bottom 6, the whole being supported upon legs 7. Within this outer casing is nested one of less dimensions comprising side members 8 and 9, end members 10 and 11, a bottom 12 and top 13, which top is removable and has air passages in the side edges thereof. Within this inclosure is incased a third receptacle or tray comprising sides 14 and 15, ends 17 and 18, and bottom 20. These three receptacles are held rigidly in place and spaced from each other by the corner pieces $a$ and $b$ and side blocks $c$, which spaces provide the air chambers for the purpose above stated. The bottom 12 of the second receptacle is provided with openings 12' extending the entire length of the receptacle, and centrally disposed over said openings and extending their entire length is a partition 13', extending from the plane of the top of the bottom 12 to the bottom 20 of the third receptacle. The innermost receptacle constitutes the hatching chamber for the eggs, for which purpose it is divided into compartments A, B, C, and D by removable partition pieces 19, 20', and 21; and within each of the chambers A, B, C, and D is a removable egg tray E. It will thus be seen that by this disposition of the hatching chamber a number of independent hatching sections are provided, whereby it is possible to hatch eggs in different lots and at different periods, or to hatch different kinds of eggs, thus: hen eggs could be treated in chambers A and B, while duck eggs were being hatched in C and D.

To gain access to the hatching chambers A, B, C and D the front side 1 of the outer casing is fitted with a hinged door $d$ which carries with it corresponding sections $e$ and $f$ of the sides 8 and 15 respectively. The three panels constituting the door are each fitted with glass whereby the operations within the hatching chambers may be observed without opening the door.

The chambers A, B, C and D are aired by means of the ventilator K which is formed integral with the underside of the tank F and running substantially the length thereof. At suitable distances throughout its length the ventilator is provided with perforations $k$ leading to the several hatching chambers. The amount of air admitted through the ventilator K is regulated by the damper L located at the rear of the incubator. To facilitate the removal of the tank in order to gain access to the incubator chambers from above, the ventilator tube K is divided at the rear inner wall 18, as shown in Fig. 3, at which point is a ledge 49 on the wall 18 to support the rear end of the tank. The egg chambers are provided with fresh air which passes in through the ventilator K, which air when passing through said ventilator is partially warmed by contact with the heating tank, and then passing through the small perforations $k$ into the hatching chambers. Then by the slow suction of the foul air ducts 47, this air is drawn down to the eggs, but not through the eggs, as the bottom of the egg trays is purposely made solid to prevent this. In this manner there is always a supply of fresh air in the egg chamber, but absolutely no draft through the eggs. Thus the eggs are left to hatch with their own natural moisture. This moisture is maintained constant because there is no dry or heated air from the lamp to enter the egg chamber.

The heating apparatus for the incubator comprises substantially a rectangular tank F, having a reduced extension or projection, G, protruding through the frames adjacent to end 3 of the incubator. The tank is provided with a substantially horizontal recess or chamber 22 extending approximately the length of the tank and terminating in a downwardly and flared opening 23 through the extension G. The recess 22 is disposed substantially in the center of the tank F to provide spaces 24 and 25 respectively above and below the recess, and at the terminating end 23 thereof a chamber 26 equal in depth to the depth of the heating tank is provided and affords an opportunity for the water in the heating tank to circulate freely around the opening 23. The spaces 24, 25 and 26 contain the water to be heated, and for the purpose of filling the same a supply pipe 27 is provided, which extends through the top members 5 and 13 of the intermediate and outer receptacles. The heat being applied at 23 it will be see that substantially all of the heating of the water takes place at the ends 26. This causes the water in the chambers 24, 25 and 26 to circulate slowly, both above and below the heat chamber 22 and around the opening 23 as shown in the drawings. This circulation of the water is important, for it is by means of such circulation that an even temperature is secured throughout the whole interior of the incubator. Actual practice has proved that in my incubator the heat at the end farthest from the lamp is approximately the same as in the end next to the lamp. This will be true no matter how long the incubator may be. To diffuse the heat within the chamber 22 the usual lamp I is used, which lamp rests upon a supporting shelf 28 secured to the under side of the outer frame at the end 3. The globe of the lamp I fits within the opening 23 of the tank, which opening by reason of its peculiar design directs the heat to the walls of the chamber 22, thus heating the water within the tank to any desired temperature.

Upon the bottom of the heat chamber, across the opening 23, is a ridge or wall 23′, which renders the bottom of the heat chamber 22 capable of holding a thin layer of free water 24′. To supply water to this receptacle is provided the inlet pipe 25′, extending upward through the several compartments to the outside of the incubator. This free water on the bottom of the heat chamber 22 takes up any poisonous gases that may come from the lamp, and the air in the room in which the incubator is operated is therefore always in a fresh moistened condition. This fresh moistened air enters the incubator through the ventilator K., thus enabling the air in the hatching chamber to retain its natural moisture, which is necessary to soften the shells of the eggs. For distributing the heat within the chamber 22, and deflecting its draft from interference with the operations of the valve 30, there is provided a deflector 50, secured to the inner walls of said chamber and located near the opening 23 thereof.

To regulate the temperature of the water in the tank, an automatic means is devised, which consists of valves 29 and 30, hung from a supporting wire 31 by links 32 and 33 respectively, which wire is in turn fulcrumed upon a support 34 to properly hold the valves 29 and 30 in their proper positions. A guide 35 is provided for keeping the wire 31 in proper alinement and thereby hold the valves 29 and 30 against any swinging or other movement which would tend to displace them from operative position. The function of valve 29 is to close the opening of the heat outlet pipe 36, and valve 30 is for a similar purpose on the pipe 37, but to be used only in case of emergency for properly regulating the relative positions of these valves. On the wire 31 is slidably adjusted a controlling weight 38 whereby the temperature within the incubator may be regulated as hereinafter described. When the desired degree of temperature has been decided, the weight is accordingly set in position, in which position the bar 31 is substantially horizontal as shown in Fig. 3, thus raising the valve 29 but seating the valve 30 against the outlet opening of the pipe 37. Heat having now been diffused within the chamber 22 and bringing the temperature of the water in the tank to the desired point, the incubator is in prime condition for operation. While in this state, the heat after having circulated within the chamber 22, passes out through the pipe 36, to facilitate which the valve 29 is provided with an aperture 39, located at a point substantially central of the outlet pipe. The liberated heat thence circulates within the upper portion of the incubator, passes downwardly and throughout the space 46, within space 45, thence downwardly through the opening 12′ in the bottom 12, thence upwardly between the intermediate and outer walls, i. e. within the spaces 42 thence throughout the space 41, and is discharged through vent 48 at the top. To carry off foul air from the egg chambers, a number of ducts 47 are provided, which ducts are shown as communicating with the chambers A and D and space 43. If for any reason the temperature within the chamber 22 should exceed the determined degree, the excess of heat passing out through the opening 36, would cause sufficient draft against the valve 29 to raise the same a distance sufficient to cause the tilting of its supporting wire 31, and thereby lower or unseat the valve 30 from the outlet pipe 37, which would then permit outside air to enter therethrough and within the chamber 22 until the proper temperature has been reached, whereupon the valves 29 and 30 would again assume their normal or set position. When the valve 30 has been unseated from the position shown in Fig. 3 it rests upon the spider 52.

What is claimed as new is,—

1. In an incubator, the combination with a plurality of nested receptacles, of a heating tank within said receptacles, a heating passage-way within said tank and communicating with the interior of said incubator, and separate means for ventilating the incubator.

2. In an incubator, the combination with a plurality of nested receptacles, of a heating tank within said receptacles, a heating passage-way within said tank and communicating with the interior of the incubator, said receptacles being spaced whereby to provide circulating passages for the heating medium from said tank passage-way, and separate means for admitting air to said incubator.

3. In an incubator, the combination with inner, intermediate and outer nested receptacles, said receptacles being spaced to provide communicating passage-ways between the side, top and bottom walls thereof, a heating tank within the incubator and provided with a heating passage-way therethrough, said passage-way communicating with the interior of the incubator whereby to deliver heating medium therein to circulate through said passage-ways, and means for ventilating the incubator.

4. In an incubator, the combination with a plurality of nested receptacles, said receptacles being spaced to provide air passages therebetween, a heating tank within the incubator, and superposed on the innermost receptacles whereby to provide a hatching chamber, a heating passage-way through said tank and communicating with the interior of the incubator, means within the incubator for automatically regulating the heating medium in said passage-way, and means for admitting outside air to said hatching chamber.

5. In an incubator, the combination with an inner, intermediate and outer nested receptacle, of means for spacing said receptacles whereby to provide communicating passages, a heating tank within said incubator, said tank superposed on the inner receptacle and providing therewith a closed hatching chamber, a heating passage-way through said tank and communicating with the interior of the incubator whereby to deliver heated air to said passage-ways, automatic means for regulating the heat within said tank, and ventilating means for delivering outside air to the hatching chamber.

In testimony whereof I have hereunto set my hand in presence of two subscribing witnesses.

PATRICK J. McCABE.

Witnesses:
W. J. SICHLER,
JOHN MAY.